United States Patent Office 3,205,208
Patented Sept. 7, 1965

3,205,208
THREE-COMPONENT ORGANOMETALLIC-TRANSITION METAL HALIDE CATALYSTS AND OLEFIN POLYMERIZATION
Harry W. Coover, Jr., and Frederick B. Joyner, Kingsport, Tenn., assignors to Eastman Kodak Company, Rochester, N.Y., a corporation of New Jersey
No Drawing. Filed Oct. 26, 1960, Ser. No. 64,999
The portion of the term of the patent subsequent to Sept. 1, 1981, has been disclaimed and dedicated to the Public
18 Claims. (Cl. 260—93.7)

This invention relates to a new and improved polymerization process and is particularly concerned with the use of a novel catalyst combination for preparing high molecular weight solid polyolefins, such as polypropylene, of high density and crystallinity. In a particular aspect the invention is concerned with the preparation of polypropylene and higher polyolefins having a high crystallinity and a high density using a particular catalyst combination which has unexpectedly improved catalytic activity.

Polyethylene has heretofore been prepared by high pressure processes to give relatively flexible polymers having a rather high degree of chain branching and a density considerably lower than the theoretical density. Thus, pressures of the order of 500 atmospheres or more and usually of the order of 1000–1500 atmospheres are commonly employed. It has been found that more dense polyethylenes can be produced by certain catalyst combinations to give polymers which have very little chain branching and a high degree of crystallinity. The exact reason why certain catalyst combinations give these highly dense and highly crystalline copolymers is not readily understood. Furthermore, the activity of the catalysts ordinarily depends upon certain specific catalyst combinations, and the results are ordinarily highly unpredictable, since relatively minor changes in the catalyst combinations often lead to liquid polymers rather than the desired solid polymers.

Certain metal derivatives have been suggested for use in conjunction with inorganic halides to produce high molecular weight polyethylene. Thus, it has been suggested that alkyl derivatives of alkali metals, zinc or magnesium can be used with transition metal halides in the low pressure polymerization of ethylene. When these catalysts are employed to polymerize propylene and higher α-monoolefins, the resulting polymeric product contains large amounts of oils, greases and rubbery polymers instead of the desired high molecular weight, crystalline product. Obviously, such results are unsatisfactory when a crystalline polymer is the desired product, and it is one of the purposes of this invention to overcome the undesirable results obtained when prior art catalysts are used.

This invention is concerned with and has for an object the provision of improved processes whereby α-monoolefins and particularly propylene can be readily polymerized by catalytic means to give high molecular weight, highly crystalline polymers. A particular object of the invention is to provide an improved catalyst combination which has unexpectedly improved catalytic activity for the polymerization of propylene and higher α-monoolefins to form crystalline high density polymers. Other objects will be apparent from the description and claims which follow.

The above and other objects are attained by means of this invention, wherein α-monoolefins, either singly or in admixture, are readily polymerized to high molecular weight solid polymers by effecting the polymerization in the presence of a catalytic mixture containing a metal derivative having one of the formulas $$RM', R_2M^2 \text{ and } RM^2X$$

wherein M' is an alkali metal selected from the group consisting of sodium, potassium and lithium and $M^2$ is a metal selected from the group consisting of magnesium and zinc. R is a radical selected from the group consisting of alkyl radicals containing 1 to 8 carbon atoms, phenyl and benzyl and X is a halogen selected from the group consisting of chlorine, bromine and iodine. The second component of the catalyst is a halide of a metal selected from the group consisting of titanium, vanadium, zirconium chromium and molybdenum, the halogen atoms being selected from the group consisting of chlorine, bromine and iodine, and the third component of the catalyst is selected from the group consisting of halides, alkoxides, alkoxyhalides and acetylacetonates, and an amide as a third component. The amide can have the structural formula

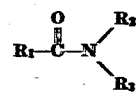

wherein $R_1$ is a radical selected from the group consisting of hydrogen, alkyl radicals containing from 1 to 20 carbon atoms, phenyl, carboxyl, —OR, —N(R)$_2$ and

wherein R is an alkyl radical containing 1 to 4 carbon atoms, n is an integer of 1 to 4, and each of $R_2$ and $R_3$ is a radical selected from the group consisting of hydrogen, alkyl radicals containing 1 to 8 carbon atoms, phenyl and cyclohexyl.

The amide third component of the catalyst can have the structural formulas

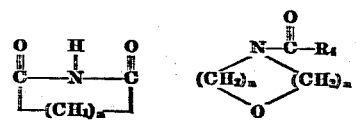

and

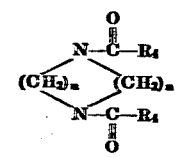

wherein n is an integer of 1 to 4 and $R_4$ is a radical selected from the group consisting of alkyl radicals containing 1 to 4 carbon atoms and phenyl.

Other third components that can be employed in the catalyst are phosphorus-containing amides having the structural formulas:

and

wherein $x$ and $y$ are whole numbers from 1 to 3 and 0 to 2 respectively, the sum of $x$ and $y$ being 3, and $x_1$ and $y_1$ are whole numbers from 1 to 2, the sum of $x_1$ and $y_1$ being 3, and $R_5$, $R_6$ and $R_7$ are alkyl radicals containing 1 to 8 carbon atoms.

Amide third coponents that can be used in the catalyst system are N,N-dimethylformamide, N,N-dimethyllacetamide, N,N-diethylacetamide, N-cyclohexaylacetamide, N-t-butylbenzamide, N-methyl-N-phenylacetamide, N-benzylacetamide, n-heptamide, palmitamide, stearanilide, acetanilide, isobutyramide, N,N'-di-t-butylurea tetramethylurea, succinimide, N,N,N',N'-tetramethyl adipamide, N-methylisobutyramide, N-benzoylmorpholine, N,N'-diacetylpiperazine, n-butyloxamate, ethyloxanilate, ethyl carbamate, diethyl N-dimethylamidophosphate, ethyl N,N- tetraethyl amidophosphate, diethyl N-dimethylamidophosphite, ethyl N,N-tetraethyl diamidophosphite, N,N,N-hexaethyl triamidophosphite, dibutyl N-dipropyl amidophosphate, n-pentyl N,N-tetrabutyl amidophosphate, dipropyl N-dioctyl amidophosphite, n-hexyl N,N-tetrabutyl diamidophosphite, N,N,N - hexa(n-hexyl)triamidophosphite.

Catalyst mixtures that can be employed in practicing our invention are:

(a) Amyl sodium, titanium trichloride and N-cyclohexylacetamide.
(b) Phenyl magnesium bromide, titanium tetraethoxide and N-methyl-N-phenylacetamide.
(c) Diethyl zinc, zirconium tetrabutoxide and palmitamide.
(d) Butyl lithium, zirconium tetrachloride and acetanilide.
(e) Diethyl magnesium, vanadium triethoxide and isobutyramide.
(f) Octyl potassium, molybdenum pentachloride and N,N'-di-t-butylurea.
(g) Dihexyl zinc, titanium tetrachloride and ethyl carbamate.
(h) n-Heptyl lithium, titanium trichloride and ethyl N,N-tetraethyl amidophosphate.
(i) Benzyl magnesium iodide, vanadium trichloride and dimethyl N-dimethyl amidophosphate.
(j) Octyl magnesium chloride, titanium trichloride and N,N,N-hexamethyl triamidophosphite.
(k) Ethyl lithium, titanium tetrachloride and dimethyl N-dimethylamidophosphite.

The improved catalytic activity of this mixture was wholly unexpected, particularly since mixtures containing only the organometallic compounds and the metal halides described above produce large amounts of comparatively low molecular weight products in the polymerization of propylene and higher olefins. The inventive process can be carried out in liquid phase in an inert organic liquid and preferably an inert liquid hydrocarbon vehicle, but execellent results can be obtained without using a solvent. The process proceeds with excellent results over a temperature range of from 0° C. to 250° C. but temperatures outside this range can be used if desired. Likewise, the reaction pressures may be varied widely from about atmospheric pressure to very high pressures of the order of 20,000 p.s.i. or higher. A particular advantage of the invention is that pressures of the order of 30–1000 p.s.i. give excellent results, and it is not necessary to employ the extremely high pressures which were necessary heretofore. The liquid vehicle employed is desirably one which serves as an inert liquid reaction medium.

The invention is of particular importance in the preparation of highly crystalline polypropylene, the polybutenes and polystyrene although it can be used for polymerizing mixtures of ethylene and propylene as well as other α-monoolefins containing up to 10 carbon atoms. The polypropylene produced in accordance with this invention is a highly crystalline polymer that can be used in molding operations to form products of excellent clarity. The high molecular weight, high density polymers of this invention are insoluble in solvents at ordinary temperatures but they are soluble in such solvents as xylene, toluene or tetralin at elevated temperatures. These solubility characteristics make it possible to carry out the polymerization process under conditions wherein the polymer formed is soluble in the reaction medium during the polymerization and can be precipitated therefrom by lowering the temperature of the resulting mixture.

The novel catalysts described above are particularly useful for polymerizing propylene to form a crystalline, high-density polymer. The polypropylene produced has a softening point above 155° C. and a density of 0.91 and higher. Usually the density of the polypropylene is of the order of 0.91 and 0.92.

The polypropylene, polystyrene, polybutenes and other polyolefins prepared in accordance with the invention can be molded or extruded and can be used to form plates, sheets, films, or a variety of molded objects which exhibit a higher degree of stiffness than do the corresponding high pressure polyolefins. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polymers obtained according to this process.

As has been indicate dabove the improved results obtained in accordance with this invention depend upon the particular catalyst combination. Thus, one of the components of the catalyst is an organometallic compound having the formulas $RM'$, $R_2M^2$ and $RM^2X$ wherein $M'$ is an alkali metal selected from the group consisting of sodium, potassium and lithium, $M^2$ is a metal selected from the group consisting of magnesium and zinc, R is a radical selected from the group consisting of alkyl radicals containing 1 to 8 carbon atoms, phenyl and benzyl, and X is a halogen selected from the group consisting of chlorine, bromine and iodine. Another component of the catalyst composition is a halide of a transition metal selected from the group consisting of titanium, vanadium, zirconium, chromium and molybdenum, the halogen atoms being selected from the group consisting of chlorine, bromine and iodine. The transition metal can be at its maximum valency or at a reduced valency. Thus, titanium tetrachloride as well as titanium trichloride and titanium dichloride can be used in the catalyst composition. The third component of the catalyst composition is as defined above.

The limiting factor in the temperature of the process appears to be the decomposition temperature of the catalyst. Ordinarily, temperatures from 50° C. to 150° C. are employed, although temperatures as low as 0° C. can be employed if desired. Usually, it is not desirable or economical to effect the polymerization at temperatures below 0° C., and the process can be readily controlled at room temperature or higher which is an advantage from the standpoint of commercial processing. The pressure employed is usually only sufficient to maintain reaction mixture in liquid form during the polymerization, although higher pressures can be used if desired. The pressure is ordinarily achieved by pressuring the system with the monomer whereby additional monomer dissolves in the reaction vehicle as the polymerization progresses.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 2% by weight based on the weight of the vehicle. The concentration of the monomer in the vehicle will vary rather widely depending upon the reaction conditions and will usually range from about 2 to 50% by weight. For a solution process it is preferred to use a concentration from about 2 to about 10% by weight based on the weight of the vehicle, and for a slurry type of process higher concentrations, for example up to 40% and higher are preferred. Higher concentrations of monomer ordinarily increase the rate of polymerization, but concentrations of 5 to 10% by weight in a solution process are ordinarily less desirable because the polymer dissolved in the reaction medium results in a very viscous solution.

The molar ratio of organometallic compound to transition metal halide can be varied within the range of 1:0.5 to 1:2, and the molar ratio of transition metal halide to the third component of the catalytic mixture can be varied within the range of 1:1 to 1:0.1, but it will be understood that higher and lower molar ratios are within the scope of this invention. A particularly effective catalyst contains one mole of transition metal trihalide and 0.25 mole of the third component per mole of organometallic compound. The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffin which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-pentane, n-octane, isooctane, methyl cyclohexane, tetralin, decalin, and any of the other well known inert liquid hydrocarbons.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired. The importance of the various components of this reaction mixture is evident from the fact that in polymerizing propylene a mixture of organometallic compound and transition metal halide produces large amounts of low molecular weight rubbery polymer. However, when the third component within the scope of this invention is added to the mixture the resulting catalyst composition is highly effective for polymerizing propylene to form a highly crystalline high-density polymer.

The invention is illustrated by the following examples of certain preferred embodiments thereof.

*Example 1*

In a nitrogen-filled dry box, a total of 2 g. of catalyst was added to a 500-ml. pressure bottle containing 100 ml. of dry heptane. The catalyst was made up of phenylmagnesium bromide, titanium tetrachloride, and N,N-dimethylformamide in a molar ratio of 2:2:1. The pressure bottle was then attached to a source of propylene, and the reaction mixture was agitated, heated to 75° C. and maintained under 30 p.s.i. propylene pressure for 6 hours. At the end of this time, the bottle was removed from the propylene source, dry isobutyl alcohol was added to deactivate the catalyst, and then the polymer was washed with hot, dry isobutanol to remove the catalyst residues. The yield of highly crystalline polypropylene was 13.0 g. This polymer had an inherent viscosity in tetralin at 145° C. of 2.10 and a density of 0.915.

When a control experiment was run using only the phenylmagnesium bromide and titanium tetrachloride omitting the N,N-dimethylformamide, little or no crystalline polypropylene was formed under these conditions.

*Example 2*

Inside a nitrogen-filled dry box, a 285-ml. stainless steel autoclave was loaded with 2 g. of three-component catalyst comprising a 1:1:0.25 molar ratio of butyllithium, titanium trichloride and N,N-dimethylacetamide, and 100 ml. of dry mineral spirits (B.P. 197° C.). The autoclave was sealed, placed in a rocker, and 100 ml. (51 g.) of dry, liquid propylene was added. Rocking was initiated, and the mixture was heated to 85° C. and maintained at this temperature for 6 hours. The polymer was worked up as described in Example 1 to give a yield of 35 g. of highly crystalline polypropylene having an inherent viscosity of 4.25 in tetralin at 145° C. When hydrogen was admitted to the polymerization vessel and was maintained there at 50 p.s.i. partial pressure, the inherent viscosity of the product was 2.32. An increase in the hydrogen pressure to 500 p.s.i. in a similar experiment produced a very low-molecular-weight crystalline polypropylene of inherent viscosity 0.62.

*Example 3*

The procedure of Example 2 was used to polymerize propylene with no solvent present. One hundred grams of liquid propylene monomer was used and within the 6-hour reaction period at 85° C., a 78-g. yield of highly crystalline polypropylene of inherent viscosity 4.9 was obtained.

*Example 4*

The procedure of Example 2 was employed to polymerize a 50-g. charge of 3-methyl-1-butene using 3 g. of catalyst made up of diethylzinc, vanadium trichloride and N-cyclohexylacetamide in a molar ratio of 1:1:0.1. The yield was 28.2 g. of highly crystalline poly(3-methyl-1-butene). This polymer in the form of an oriented film gave a crystalline melting point of 308–310° C. N-t-butylbenzamide of N-benxylacetamide could be used in place of the N-cyclohexylacetamide to give similar results.

*Example 5*

The procedure of Example 2 was used to polymerize a 50-g. charge of styrene using 0.75 g. of catalyst comprised of amylsodium, zirconium tetrachloride and tetramethylurea. A 19.5-g. yield of crystalline polystyrene was obtained. This polymer had an inherent viscosity of 2.60 and a crystalline melting point (powder) of 233–240° C.

Example 6

In a nitrogen-filled dry box, a 7-oz. tapered pressure bottle was charged in order with 40 ml. of dry benzene, 20 g. of 4-methyl-1-pentene and 1 g. of a catalyst consisting of benzylpotassium, vanadium trichloride and N-benzoylmorpholine in a molar ratio of 1:3.1. The bottle was capped, placed on a rotating wheel in a constant-temperature water bath maintained at 70° C. and was allowed to remain under these conditions for 24 hours. At the end of this period, the bottle was removed, allowed to cool and opened. The polymer was dissolved in hot xylene and reprecipitated by the addition of dry isobutanol to the xylene solution in a Waring Blendor. The polymer was washed several times with hot isobutanol and was dried. The crystalline poly(4-methyl-1-pentene) weighed 9.4 g. and melted at 200–205° C. (powder). Allylbenzene, vinylcyclohexane, butadiene, isoprene, and 3-phenyl-1-butene were readily polymerized by this procedure to give solid polymers. Other amides which gave similar results when used in place of N-benzoylmorpholine include butyl oxamate, ethyl carbamate, N,N,N',N'-tetramethyladipate and N-methyl-N-phenylacetamide.

Example 7

The procedure of Example 2 was followed except that the catalyst charge was 1 gram of a mixture of diethylzinc, titanium trichloride and N,N-diethylacetamide in a molar ratio of 1:1:0.5. No solvent was employed and the polymerization temperature was 85° C. The crystalline polypropylene obtained had a density of 0.913 and an inherent viscosity of 1.85.

Other amides which may be used to give similar results include N-t-butylbenzamide, N-benzylacetamide, N-heptamide, palmitamide, stearamide, acetanilide, isobutyramide, N,N'-di-ti-butylurea, succinimide, N-methylisobutyramide, N,N'-diacetylpiperazine, and ethyl oxanilate.

When titanium trichloride in the above catalyst is replaced by zirconium tetrachloride, chromic chloride, or molybdenum pentachloride improved yields of polypropene are realized. Similarly, highly crystalline polyolefins were also obtained by using 1-butene, 1-pentene, 4-methyl-1-pentene, styrene, allyl benzene, fluorostyrene and vinyl cyclohexane as monomers in place of propylene.

Thus, by means of this invention polyolefins such as polypropylene are readily produced using a catalyst combination that has been found to have unexpected activity for producing highly crystalline polymer in excellent yields. The polymers thus obtained can be extruded, mechanically milled, cast or molded as desired. The polymers can be used as blending agents with the relatively more flexible high pressure polyethylenes to give any desired combination of properties. The polymers can also be blended with antioxidants, stabilizers, plasticizers, fillers, pigments, and the like, or mixed with other polymeric materials, waxes and the like. In general, the polymers embodying this invention can be treated in similar manner to those obtained by other processes.

From the detailed disclosure of this invention it is quite apparent that in this polymerization procedure a novel catalyst, not suggested in prior art polymerization procedures, is employed. As a result of the use of this novel catalyst it is possible to produce polymeric hydrocarbons, particularly polypropylene, having properties not heretofore obtainable. For example, polypropylene prepared in the presence of catalyst combinations within the scope of this invention is substantially free of rubbery and oily polymers and thus it is not necessary to subject such polypropylene of this invention to extraction procedures in order to obtain a commercial product.

Also polypropene produced in accordance with this invention possesses unexpectedly high crystallinity, an unusually high softening point and outstanding thermal stability. Such polypropene also has a very high stiffness as a result of the unexpectedly high crystallinity. The properties imparted to polypropylene prepared in accordance with this invention thus characterize and distinguish this polypropylene from polymers prepared by prior art polymerization procedures.

The novel catalysts defined above can be used to produce high molecular weight crystalline polymeric hydrocarbons. The molecular weight of the polymers can be varied over a wide range by introducing hydrogen to the polymerization reaction. Such hydrogen can be introduced separately or in admixture with the olefin monomer. The polymers produced in accordance with this invention can be separated from polymerization catalyst by suitable extraction procedures, for example by washing with water or lower aliphatic alcohols, such as methanol.

The catalyst compositions have been described above as being effective primarily for the polymerization of α-monoolefins. These catalyst compositions can, however, be used for polymerizing other α-olefins, and it is not necessary to limit the process of the invention to monoolefins. Other α-olefins that can be used are butadiene, isoprene, 1,3-pentadiene and the like.

The diluents employed in practicing this invention can be advantageously purified prior to use in the polymerization reaction by contacting the diluent, for example in a distillation procedure or otherwise, with the polymerization catalyst to remove undesirable trace impurities. Also, prior to such purification of the diluent the catalyst can be contacted advantageously with polymerizable α-monoolefin.

Although the invention has been described in considerable detail with reference to certain preferred embodiments thereof, variations and modifications can be effected within the spirit and scope of this invention as described hereinabove and as defined in the appended claims.

This application is a continuation-in-part of our copending application Serial No. 724,902, filed March 31, 1958, and now U.S. Patent 2,958,688.

We claim:
1. In the polymerization of α-olefins containing 2 to 10 carbon atoms to form solid crystalline polymer, the improvement which comprises catalyzing the polymerization with a catalytic mixture consisting essentially of an organometallic compound having the formulas RM', R$_2$M$^2$ and RM$^2$X wherein M' is an alkali metal selected from the group consisting of sodium, potassium and lithium, M$^2$ is a metal selected from the group consisting of magnesium and zinc, R is a radical selected from the group consisting of alkyl radicals containing 1 to 8 carbon atoms, phenyl and benzyl and X is a halogen atom selected from the group consisting of chlorine, bromine and iodine, a halide of a transition metal selected from the group consisting of titanium, vanadium, zirconium, chromium and molybdenum, the halide being selected from the group consisting of chlorine, bromine and iodine, and a third component selected from the amides having the formulas:

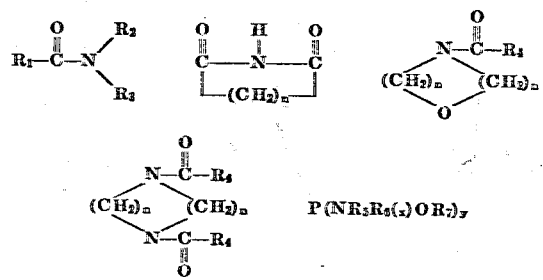

and

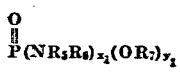

wherein $R_1$ is a radical selected from the group consisting of alkyl radicals containing 1 to 20 carbon atoms, phenyl, carboxyl, —OR, —N(R)$_2$ and

wherein R is an alkyl radical containing 1 to 4 carbon atoms, $n_1$ is an integer of 1 to 4, and wherein each of $R_2$ and $R_3$ is a radical selected from the group consisting of hydrogen, alkyl radicals containing 1 to 8 carbon atoms, phenyl and cyclohexyl, $R_4$ is a radical selected from the group consisting of alkyl radicals containing 1 to 4 carbon atoms and phenyl and $n$ is an integer of 1 to 4, and wherein $R_5$, $R_6$ and $R_7$ are alkyl radicals containing 1 to 8 carbon atoms, $x$ and $y$ are whole numbers from 1 to 3 and 0 to 2, respectively, the sum of $x$ and $y$ being 3 and $x_1$ and $y_1$ are whole numbers from 1 to 2, the sum of $x_1$ and $y_1$ being 3, the molar ratio of transition metal halide to third component being within the range of 1:1 to 1:0.1.

2. In the polymerization of propylene to form solid crystalline polymer the improvement which comprises effecting the polymerization in the presence of a catalytic mixture consisting essentially of an alkyl derivative containing 1 to 8 carbon atoms of an alkali metal selected from the group consisting of sodium, potassium and lithium, a titanium halide and a third component selected from the amides having the formula:

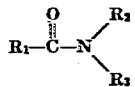

wherein $R_1$ is a radical selected from the group consisting of alkyl radicals containing 1 to 20 carbon atoms, phenyl, carboxyl, —OR, —N(R)$_2$ and

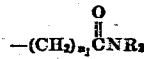

wherein R is an alkyl radical containing 1 to 4 carbon atoms and wherein $n_1$ is an integer of 1 to 4, and wherein each or $R_2$ and $R_3$ is a radical selected from the group consisting of hydrogen, alkyl radicals containing 1 to 8 carbon atoms, phenyl and cyclohexyl, the molar ratio of titanium halide to third component being within the range of 1:1 to 1:0.1.

3. In the polymerization of propylene to form solid crystalline polymer the improvement which comprises effecting the polymerization in the presence of a catalytic mixture consisting essentially of an alkyl derivative containing 1 to 8 carbon atoms of an alkali metal selected from the group consisting of sodium, potassium and lithium, a titanium halide and a third component selected from the amides having the formula P(NR$_5$R$_6$)$_x$(OR$_7$)$_y$ wherein $R_5$, $R_6$ and $R_7$ are alkyl radicals containing 1 to 8 carbon atoms, and $x$ and $y$ are whole numbers from 1 to 3 and 0 to 2, respectively, the sum of $x$ and $y$ being 3, the molar ratio of titanium halide to third component being within the range of 1:1 to 1:0.1.

4. In the polymerization of propylene to form solid crystalline polymer the improvement which comprises effecting the polymerization in the presence of a catalytic mixture consisting essentially of an alkyl derivative containing 1 to 8 carbon atoms of an alkali metal selected from the group consisting of sodium, potassium and lithium, a titanium halide and a third component selected from the amides having the formula:

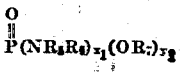

wherein $R_5$, $R_6$ and $R_7$ are alkyl radicals containing 1 to 8 carbon atoms, and $x_1$ and $y_1$ are whole numbers from 1 to 2, the sum of $x_1$ and $y_1$ being 3, the molar ratio of titanium halide to third component being within the range of 1:1 to 1:0.1.

5. In the polymerization of propylene to form solid crystalline polymer the improvement which comprises effecting the polymerization in liquid dispersion in an organic liquid and in the presence of a catalytic mixture consisting essentially of amyl sodium and titanium trichloride and a molar ratio of titanium trichloride and N,N-dimethylformamide within the range of 1:1 to 1:0.1.

6. The method according to claim 5 wherein vanadium trichloride is used in the catalyst mixture in place of titanium trichloride.

7. The method according to claim 5 wherein N,N-dimethylacetamide is used in the catalyst mixture in place of N,N-dimethylformamide.

8. In the polymerization of propylene to form solid crystalline polymer the improvement which comprises effecting the polymerization in liquid dispersion in an inert organic liquid and in the presence of a catalytic mixture of phenyl magnesium bromide and titanium tetrachloride and a molar ratio of titanium tetrachloride to N,N,N',N'-tetramethyladipamide within the range of 1:1 to 1:0.1.

9. In the polymerization of propylene to form solid crystalline polymer the improvement which comprises effecting the polymerization in liquid dispersion in an inert liquid hydrocarbon vehicle and in the presence of a catalytic mixture consisting essentially of butyl lithium and titanium tetrachloride and a molar ratio of titanium tetrachloride and ethyl N,N-tetraethyl amidophosphate within the range of 1:1 to 1:0.1.

10. As a composition of matter, a catalytic mixture consisting essentially of an organometallic compound having the formulas RM', R$_2$M$^2$ and RM$^2$X wherein M' is an alkali metal selected from the group consisting of sodium, potassium and lithium, M$^2$ is a metal selected from the group consisting of magnesium and zinc, R is a radical selected from the group consisting of alkyl radicals containing 1 to 8 carbon atoms, phenyl and benzyl and X is a halogen atom selected from the group consisting of chlorine, bromine and iodine, a halide of a transition metal selected from the group consisting of titanium, vanadium, zirconium, chromium and molybdenum, the halide being selected from the group consisting of chlorine, bromine and iodine, and a third component selected from the amides having the formulas:

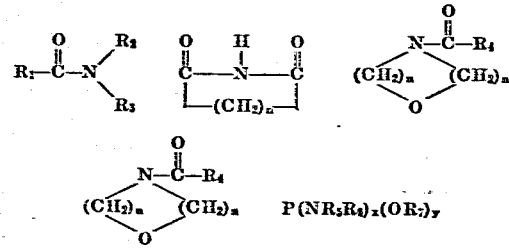

and

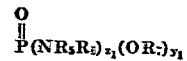

wherein $R_1$ is an alkyl radical containing 1 to 4 carbon atoms, and wherein each of $R_2$ and $R_3$ is a radical selected from the group consisting of hydrogen, alkyl radicals containing 1 to 8 carbon atoms, phenyl and cyclohexyl, $R_4$ is a radical selected from the group consisting of alkyl radicals containing 1 to 4 carbon atoms and phenyl and $n$ is an integer of 1 to 4, and wherein $R_5$, $R_6$ and $R_7$ are alkyl radicals containing 1 to 8 carbon atoms, $x$ and $y$ are whole numbers from 1 to 3 and 0 to 2, respectively, the sum of $x$ and $y$ being 3 and $x_1$ and $y_1$ are whole numbers from 1 to 2, the sum of $x_1$ and $y_1$ being 3, the molar ratio of transition metal halide to third component being within the range of 1:1 to 1:0.1.

11. As a composition of matter, a catalytic mixture consisting essentially of an alkyl derivative containing 1 to 8 carbon atoms of an alkali metal selected from the group consisting of sodium, potassium and lithium, a titanium halide and a third component selected from the amides having the formula:

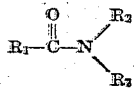

wherein $R_1$ is a radical selected from the group consisting of alkyl radicals containing 1 to 20 carbon atoms, phenyl, carboxyl, —OR, —N(R)$_2$ and

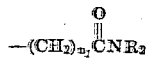

wherein R is an alkyl radical containing 1 to 4 carbon atoms and wherein $n_1$ is an integer of 1 to 4, and wherein each of $R_2$ and $R_3$ is a radical selected from the group consisting of hydrogen, alkyl radicals containing 1 to 8 carbon atoms, phenyl and cyclohexyl, the molar ratio of titanium halide to third component being within the range of 1:1 to 1:0.1.

12. As a composition of matter, a catalytic mixture consisting essentially of an alkyl derivative containing 1 to 8 carbon atoms of an alkali metal selected from the group consisting of sodium, potassium and lithium, a titanium halide and a third component selected from the amides having the formula $P(NR_5R_6)_x(OR_7)_y$ wherein $R_5$, $R_6$ and $R_7$ are alkyl radicals containing 1 to 8 carbon atoms, and $x$ and $y$ are whole numbers from 1 to 3 and 0 to 2, respectively, the sum of $x$ and $y$ being 3, the molar ratio of titanium halide to third component being within the range of 1:1 to 1:01.

13. As a composition of matter, a catalytic mixture consisting essentially of an alkyl derivative containing 1 to 8 carbon atoms of an alkali metal selected from the group consisting of sodium, potassium and lithium, a titanium halide and a third component selected from the amides having the formula:

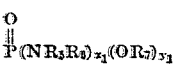

wherein $R_5$, $R_6$ and $R_7$ are alkyl radicals containing 1 to 8 carbon atoms, and $x_1$ and $y_1$ are whole numbers from 1 to 2, the sum of $x_1$ and $y_1$ being 3, the molar ratio of titanium halide to third component being within the range of 1:1 to 1:0.1.

14. As a composition of matter, a catalytic mixture consisting essentially of amyl sodium and titanium trichloride and a molar ratio of titanium trichloride and N,N-dimethylformamide within the range of 1:1 to 1:0.1 in.

15. A composition according to claim 14 wherein vanadium trichloride is used in place of titanium trichloride.

16. A composition according to claim 14 wherein N,N-dimethylacetamide is used in place of N,N-dimethylformamide.

17. As a composition of matter, a catalytic mixture consisting essentially of phenyl magnesium bromide and titanium tetrachloride and a molar ratio of titanium tetrachloride to N,N,N',N'-tetramethyladipamide within the range of 1:1 to 1:0.1.

18. As as composition of matter, a catalytic mixture consisting essentially of butyl lithium and titanium tetrachloride and a molar ratio of titanium tetrachloride and ethyl N,N-tetraethyl amidophosphate within the range of 1:1 to 1:0.1.

References Cited by the Examiner

UNITED STATES PATENTS

| | | | |
|---|---|---|---|
| 2,886,561 | 8/56 | Reynolds et al. | 260—94.9 |
| 2,905,545 | 9/59 | Andersen et al. | 252—429 |
| 2,958,688 | 11/60 | Coover et al. | 260—93.7 |
| 2,965,627 | 12/60 | Field et al. | 260—93.7 |
| 2,973,344 | 2/61 | Fasce | 260—78.4 |
| 2,996,459 | 8/61 | Andersen et al. | 252—429 |
| 3,088,942 | 5/63 | Coover | 260—93.7 |

JOSEPH L. SCHOFFER, *Primary Examiner.*

LESLIE H. GASTON, WILLIAM H. SHORT,
*Examiners.*